June 15, 1926.
H. L. INGRAM ET AL
ELECTRIC METERING SYSTEM
Filed Oct. 12, 1922
1,588,581
Fig.1,
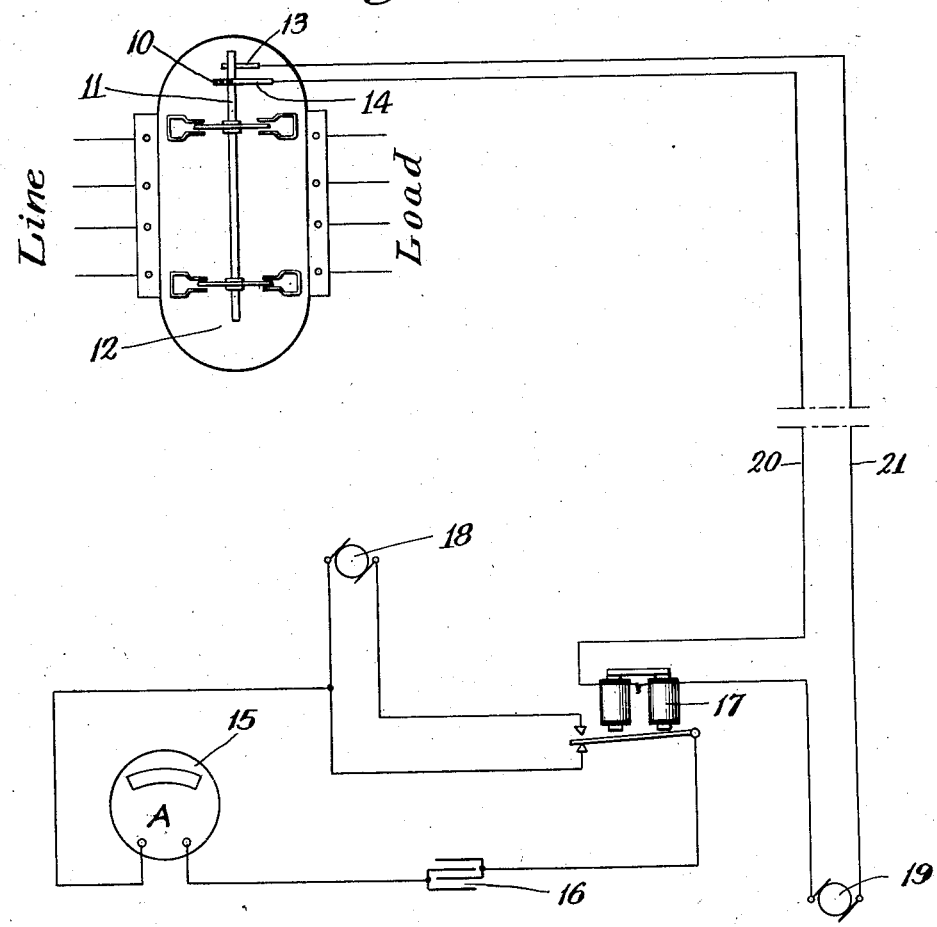
Fig.3,
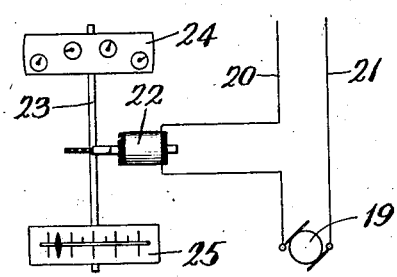
Fig.2,
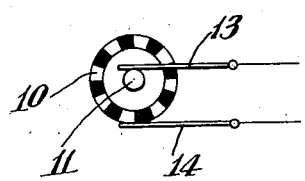
Inventors
Henry L. Ingram &
Guy T. Halton
By their Attorney Patented June 15, 1926.

1,588,581

UNITED STATES PATENT OFFICE.

HENRY L. INGRAM, OF DALLAS, AND GUY T. HALTOM, OF PORT ARTHUR, TEXAS.

ELECTRIC METERING SYSTEM.

Application filed October 12, 1922. Serial No. 594,211.

This invention relates to metering and indicating systems for use in installations where results are to be given at a location spaced apart from the point of origin.

Broadly stated our invention contemplates a system for transmitting over a circuit or other suitable transmission channel, electric impulses from a contact making device and receiving, indicating, recording or integrating the impulses at a distance by means of the charging or discharging, either or both, of an electrostatic condenser in conjunction with a relay or relays or the equivalent thereof, or by means of any mechanical, electrical or magnetic method of speed indication, recording or integration. The invention is suited for indicating, recording or integrating at any distance any force, whether electrical or mechanical.

The cost of electrical energy supplied to industrial plants by commercial electric companies is dependent to a large extent upon the maximum demand and load factor of the power used. When the industrial plant consuming the power consists of a number of plants spaced apart and supplied from different points of a transmission system, supplying other concerns with power also, it has heretofore been difficult to determine the combined demand of such plants. It is one of the objects of our invention to make provision for observing at a central point the amount of energy being used at the several plants so that the load may be partially eliminated or shifted to another source so that the use of the outside source may be carried on to the best advantage.

This and various objects will appear from the following description of the invention taken in connection with the drawings which illustrate preferred embodiments of the invention and in which:—

Figure 1 is a diagrammatic representation of the system employed.

Figure 2 shows a detailed view of a portion of the metering means,

Figure 3 is a diagrammatic representation of a modified form of the invention.

As has been stated the invention embodies a system of indicating, recording or integrating at a distance the movement of an object whether of a rotating, reciprocating, oscillating or vibrating character and in the example given in Figure 1 that type of the invention is shown in which the movement of a rotating object is to be observed. A contact making device, which may assume the form of a disc 10, is mounted on a shaft 11 which is a part of object 12, the movement of which it is desired to observe. This object may be, for example, a metering instrument such as a watthour meter, gas meter or the like. As clearly shown in Figure 2 the contact disc 10 is provided with alternate conducting and insulated segments. In the arrangement illustrated, the shaft 11 is a conductor and connected to the control circuit by means of a relatively stationary flexible brush 13. Contacting with the conducting and insulated segments of the disc 10, which is mounted on the shaft 11, there is a similar flexible brush 14 which is insulated from brush 13 and connected to the control circuit.

For showing at the receiving station the movement of the distant object there is provided an alternating current ammeter 15 preferably of the indicating or recording type, a condenser 16 and a relay 17, the latter comprising the usual magnet and contacts controlled thereby. The scale of the ammeter is preferably calibrated to read in terms of the units it is desired to meter and energy for the set is derived from a local source 18. The local circuit including the relay contacts, condenser and electroresponsive device is relatively short and therefore is of relatively low resistance as compared with the connecting circuit between the stations.

For actuating the relay 17 there is provided a suitable source of current 19. The circuit of the winding of the relay 17 and the source 19 may be interconnected with the brushes 13 and 14 by means of a pair of wires 20 and 21 extending from the transmitting station to the observing station. It is understood, however, that this trunk circuit may be completed over any available path such as a phantom circuit, or over a single conductor line using the ground as the return in a well known manner.

The connections of the contacts of the relay 17 are such that the condenser 16 is alternately charged by the potential of the source 18 and then discharged through the back contact of the relay, the circuit being through the ammeter 15. The voltage of the source 18 is held substantially constant and thus the average current through the ammeter 15 and consequently the reading of the ammeter depends upon the speed of operation of the relay 17. The relay is intermittently operated over the circuit comprising the source 19, winding of relay 17, conductor 20, brush 14, conducting segments of disc 10 (intermittently closed as the shaft 11 rotates), brush 13, and conductor 21, back to the source 19. Thus, the operation of the relay is dependent upon the speed of the rotation of the shaft 11 which is the rotating member of object 12. In this manner a reading may be taken on the ammeter 15 proportional to the movement of the object 12.

In Figure 3, the circuit from wires 20 and 21 is completed through source 19 and an operating magnet 22, which rotates the shaft 23 of a cyclometer integrating device 24 or a mechanical or magnetic speed indicating device 25, either or both as may be desired. The devices 24 and 25 may be calibrated in kilo-watt hours and kilowatts respectively.

Apparatus of preferred form and construction has been illustrated and described for the purpose of showing a way in which this invention may be used, but the inventive thought upon which the application is based is broader than this illustrative embodiment thereof, and I therefore intend no limitations other than those imposed by the appended claims.

What we claim is:—

1. In a metering system, a variably movable member, means including contacts operated by the movement of said member for producing electrical impulses at rates corresponding to the variations in the movement of said member, a relay remotely disposed with respect to the movable member and controlled by said impulses, an electrostatic condenser, means whereby said condenser is alternately charged and discharged by said relay at a rate corresponding to the movement of said member and an electroresponsive device in proximity to said condenser, said device being of such a type and being so connected to said condenser as to be affected by the variations in the rates of charge and discharge thereof.

2. In a metering system, a meter including a variable-speed movable member, contacts arranged to be intermittently operated by the movement of said movable member at a rate corresponding to its speed, a relay remotely disposed with respect to the meter and intermittently energized by said contacts, and a local circuit comprising an electrostatic condenser and a device responsive to current variations in series therewith and connections between said relay and said circuit whereby the rate of charging and discharging of the condenser in said circuit is affected by the impulsing of said relay.

3. In combination, a trunk circuit, an impulse relay at one end of said circuit, means including an electrical measuring instrument at the other end of said circuit for impulsing said relay at speeds varying in accordance with the quantity measured by said instrument, a local circuit of relatively low resistance controlled by said relay, a current-responsive device in said local circuit having a pointer whose deflection from a zero position corresponds to the strength of the current traversing the device and means including said relay for varying the current strength in said circuit and thereby causing said device to indicate the quantity measured by said remote measuring instrument.

4. A metering system comprising an integrating meter having a variable-speed rotating element, a make-and-break contact device controlled by the rotation of said element, a trunk circuit extending from said contact device to a remote point, a relay at said remote point in said circuit, a condenser and a source of current connected to the contacts of said relay and an ammeter in series with said condenser, said relay being so connected to said condenser and source of current as to successively charge and discharge said condenser from said source at rates corresponding to the varying operation of the contact device to actuate said ammeter to indicate the value of the quantity being measured by said integrating meter.

In witness whereof I have hereunto set my hand this 26th day of Sept., 1922.

HENRY L. INGRAM.

In witness whereof I have hereunto set my hand this 30th day of September, 1922.

GUY T. HALTOM.